(12) United States Patent
Kim

(10) Patent No.: US 8,482,685 B2
(45) Date of Patent: Jul. 9, 2013

(54) LIQUID CRYSTAL DISPLAY PANEL

(75) Inventor: Kyung-Wook Kim, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 34 days.

(21) Appl. No.: 12/958,935

(22) Filed: Dec. 2, 2010

(65) Prior Publication Data

US 2011/0115997 A1    May 19, 2011

Related U.S. Application Data

(63) Continuation-in-part of application No. 12/029,721, filed on Feb. 12, 2008, now abandoned.

(30) Foreign Application Priority Data

Jun. 5, 2007    (KR) .................. 10-2007-0055110

(51) Int. Cl.
- *G02F 1/141*    (2006.01)
- *G09G 3/36*    (2006.01)
- *G02F 1/1337*    (2006.01)
- *G02F 1/1343*    (2006.01)

(52) U.S. Cl.
USPC .............. 349/37; 349/129; 349/130; 349/144

(58) Field of Classification Search
USPC ......................................... 349/37
See application file for complete search history.

(56) References Cited

U.S. PATENT DOCUMENTS

| 6,040,885 | A | 3/2000 | Koike et al. |
| 2002/0054267 | A1 | 5/2002 | Matsumoto et al. |
| 2003/0202148 | A1 * | 10/2003 | Ashizawa et al. ............ 349/139 |
| 2006/0146269 | A1 | 7/2006 | Kim |
| 2006/0203172 | A1 | 9/2006 | Baek et al. |
| 2007/0115409 | A1 * | 5/2007 | Oka et al. ...................... 349/113 |

OTHER PUBLICATIONS

Office Action issued on Jun. 4, 2010 in co-pending U.S. Appl. No. 12/029,721.

* cited by examiner

*Primary Examiner* — Edward Glick
*Assistant Examiner* — Dennis Y. Kim
(74) *Attorney, Agent, or Firm* — H.C. Park & Associates, PLC

(57) ABSTRACT

In a liquid crystal display panel, an array substrate includes a plurality of pixels that each having a switching device, a first pixel electrode, a coupling electrode, and a second pixel electrode. The switching device outputs a data voltage in response to a gate signal, and the first pixel electrode and the coupling electrode are connected to an output electrode of the switching device to receive the data voltage. The second pixel electrode faces the coupling electrode and receives a voltage lower than the data voltage. The resistance between the second pixel electrode and the coupling electrode is less than the resistance between the second pixel electrode and the common electrode.

9 Claims, 6 Drawing Sheets

LIQUID CRYSTAL DISPLAY PANEL

CROSS-REFERENCE TO RELATED APPLICATION

This application is a continuation-in-part of U.S. application Ser. No. 12/029,721, filed on Feb. 12, 2008, and claims priority from and the benefit of Korean Patent Application No. 10-2007-0055110, filed on Jun. 5, 2007, which are all hereby incorporated by reference for all purposes as if fully set forth herein.

BACKGROUND OF THE INVENTION

1. Field of the Invention

The present invention relates to a liquid crystal display panel and a method of manufacturing the liquid crystal display panel. More particularly, the present invention relates to a liquid crystal display panel that may prevent the occurrence of an afterimage and a method of manufacturing the liquid crystal display panel.

2. Discussion of the Background

In general, a liquid crystal display (LCD) includes a display panel having a lower substrate, an upper substrate facing the lower substrate, and a liquid crystal layer interposed between the lower substrate and the upper substrate to display an image. The display panel includes a plurality of gate lines, a plurality of data lines, and a plurality of pixels connected to the gate lines and the data lines.

As compared to other types of display apparatuses, the LCD has a relatively narrow viewing angle. In order to improve the viewing angle, various driving methods for LCDs, such as a patterned vertical alignment (PVA) mode, a multi-domain vertical alignment (MVA) mode, and a super-patterned vertical alignment (S-PVA) mode, have been suggested.

An S-PVA mode LCD includes pixels that each have sub pixels, and each sub pixel includes a main pixel electrode and a sub pixel electrode to which different sub voltages are applied to form domains having different gray-scales from each other in the pixel. Since a person watching the S-PVA mode LCD may recognize an intermediate value of the two sub voltages, the S-PVA mode LCD may prevent side visibility deterioration due to distortion of a gamma curve under an intermediate gray-scale, thereby improving the side visibility of the S-PVA mode LCD.

An S-PVA mode LCD may be a coupling capacitor type (CC-type) or a two-transistor type (TT-type) according to the driving method thereof. The CC-type S-PVA mode LCD includes a coupling capacitor between the main pixel electrode and the sub pixel electrode and drops the voltage level of a data voltage to apply the data voltage to the sub pixel electrode as a sub pixel voltage having a lower voltage level than the main pixel voltage. The TT-type S-PVA mode LCD applies a main pixel voltage and a sub pixel voltage having different voltage levels to the main pixel electrode and the sub pixel electrode, respectively, using two transistors.

The CC-type S-PVA mode LCD includes fewer transistors than the TT-type S-PVA mode LCD, so the CC-type S-PVA mode LCD may have lower power consumption. However, the sub pixel electrode in the CC-type S-PVA mode LCD is electrically floated, so the CC-type S-PVA mode LCD may be vulnerable to the occurrence of afterimages.

SUMMARY OF THE INVENTION

The present invention provides a liquid crystal display panel that may prevent the occurrence of an afterimage in a CC-type S-PVA mode LCD.

The present invention also provides a method of manufacturing the liquid crystal display panel.

Additional features of the invention will be set forth in the description which follows, and in part will be apparent from the description, or may be learned by practice of the invention.

The present invention discloses a liquid crystal display panel including an array substrate, an opposite substrate, and a liquid crystal layer. The array substrate includes a first base substrate and a plurality of pixels arranged on the first base substrate, and the opposite substrate includes a second base substrate facing the first base substrate and a common electrode arranged on the second base substrate. The liquid crystal layer is interposed between the array substrate and the opposite substrate. Each pixel includes a switching device, a first pixel electrode, a coupling electrode, a second pixel electrode, and an inter-insulating layer. The switching device outputs a data voltage in response to a gate signal, and the first pixel electrode is connected to an output electrode of the switching device to receive the data voltage. The coupling electrode is connected to the output electrode of the switching device to receive the data voltage. The second pixel electrode faces the coupling electrode and receives a voltage lower than the data voltage. The inter-insulating layer is interposed between the coupling electrode and the second pixel electrode. The resistance between the coupling electrode and the second pixel electrode is less than the resistance between the second pixel electrode and the common electrode. The liquid crystal layer has a resistivity larger than that of the inter-insulating layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
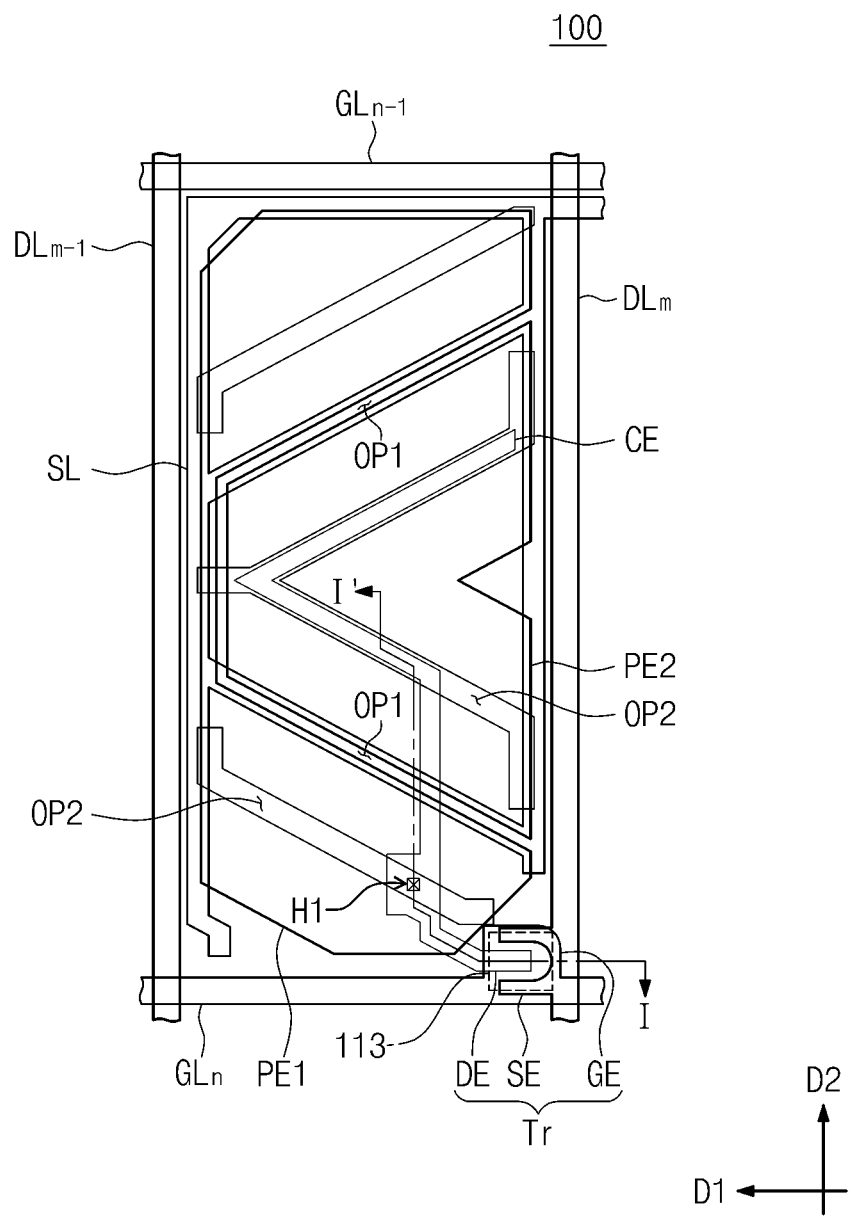
FIG. 1 is a plan view showing a liquid crystal display panel according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

Figure 2:
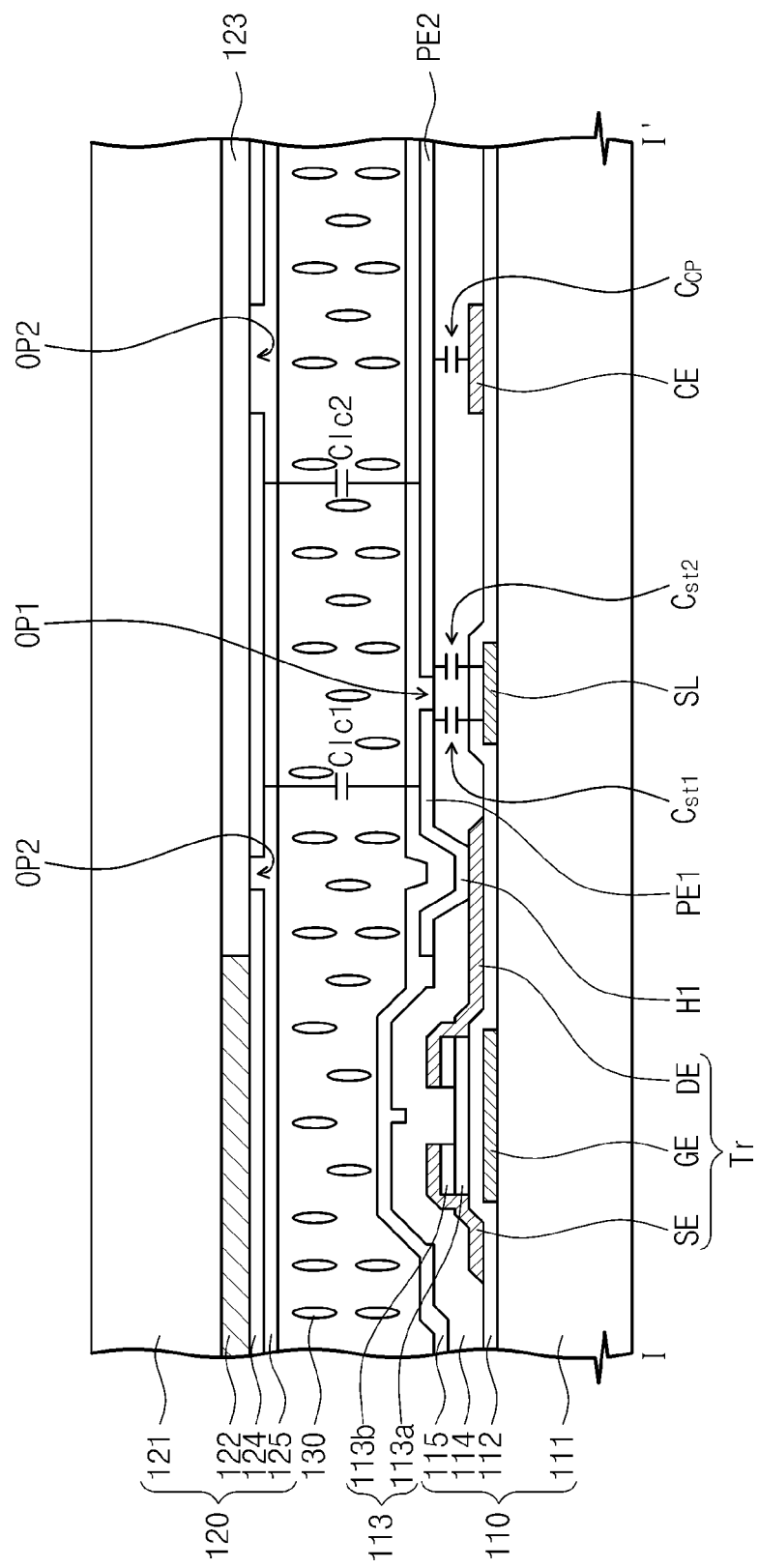
FIG. 2 is a cross-sectional view taken along line I-I' of FIG. 1.

FIG. 1 is a plan view showing a liquid crystal display panel according to an exemplary embodiment of the present invention, and FIG. 2 is a cross-sectional view taken along line I-I' of FIG. 1. FIG. 1 and FIG. 2 respectively show a layout diagram and a sectional view of a pixel among a plurality of pixels arranged in a matrix configuration in the liquid crystal display panel. Since other pixels have the same circuit configuration, detailed descriptions of the other pixels will be omitted in order to avoid redundancy.

Referring to FIG. 1 and FIG. 2, a liquid crystal display panel 100 includes an array substrate 110, an opposite substrate 120 facing the array substrate 110, and a liquid crystal layer 130 interposed between the array substrate 110 and the opposite substrate 120. The array substrate 110 includes a first base substrate 111 and a plurality of pixels arranged on the first base substrate 111 in a matrix configuration.

In FIG. 1, an $(n \times m)^{th}$ pixel among the pixels is arranged in a pixel area that is defined by an $(n-1)^{th}$ gate line $GL_{n-1}$, an $n^{th}$ gate line $GL_n$, an $(m-1)^{th}$ data line $DL_{m-1}$, and an $m^{th}$ data line $DL_m$. The $(n \times m)^{th}$ pixel is connected to the $n^{th}$ gate line $GL_n$ and the $m^{th}$ data line $DL_m$. The $(n-1)^{th}$ gate line $GL_{n-1}$ and the $n^{th}$ gate line $GL_n$ extend in a first direction D1, and the $(m-1)^{th}$ data line $DL_{m-1}$ and the $m^{th}$ data line $DL_m$ extend in a second direction D2 that is substantially perpendicular to the first direction D1 while crossing and being insulated from the $(n-1)^{th}$ gate line $GL_{n-1}$ and the $n^{th}$ gate line $GL_n$.

The $(n \times m)^{th}$ pixel includes a thin film transistor Tr, a main pixel electrode PE1, a coupling electrode CE, a sub pixel electrode PE2, and a storage line SL.

The thin film transistor Tr includes a gate electrode GE branched from the $n^{th}$ gate line $GL_n$, a source electrode SE branched from the $m^{th}$ data line $DL_m$, and a drain electrode DE spaced apart from the source electrode SE by a predetermined distance on an upper portion of the gate electrode GE.

The thin film transistor Tr, the storage line SL, and the coupling electrode CE may be formed by the following process.

A gate metal is formed on the first base substrate 111, and the gate metal is patterned to form the gate electrode GE and the storage line SL. A gate insulating layer 112 is deposited on the first base substrate 111 to cover the gate electrode GE and the storage line SL.

A semiconductor layer 113 is formed in a region corresponding to a region in which the gate electrode GE is formed on the gate insulating layer 112. The semiconductor layer 113 includes an active layer 113a and an ohmic contact layer 113b that are sequentially deposited. A data metal is formed on the gate insulating layer 112 on which the semiconductor layer 113 is formed. Then, the data metal is patterned to form the source electrode SE and the drain electrode DE that are spaced apart from each other by a predetermined distance on an upper portion of the semiconductor layer 113. The coupling electrode CE extending from the drain electrode DE is formed while the source electrode SE and the drain electrode DE are formed. Thus, the thin film transistor Tr and the storage line SL are formed on the first base substrate 111.

Then, a protective layer 114, including an inorganic insulating material such as silicon nitride ($SiN_x$), is formed on the first base substrate 111 to cover the thin film transistor Tr and the coupling electrode CE. The protective layer 114 is provided with a contact hole H1 formed therethrough to expose the drain electrode DE. As an example of the present exemplary embodiment, the protective layer 114 may have a resistivity that is less than or equal to about $1 \times 10^{12}$ Ωcm and have a thickness of about 100 Å to about 3000 Å.

A transparent conductive layer including indium tin oxide (ITO) or indium zinc oxide (IZO) is formed on the protective layer 114. Then, the transparent conductive layer is patterned to form a main pixel electrode PE1 and a sub pixel electrode PE2 that are insulated from each other. During the patterning process, the main and sub pixel electrodes PE1 and PE2 are provided with a first opening OP1 therebetween in order to space the main and sub pixel electrodes PE1 and PE2 apart from each other.

The main pixel electrode PE1 is connected to the drain electrode DE through the contact hole H1 formed through the protective layer 114. The sub pixel electrode PE2 partially overlaps the coupling electrode CE and the protective layer 114 is interposed therebetween. Each of the main and sub pixel electrodes PE1 and PE2 partially overlaps the storage line SL.

Thus, a coupling capacitor $C_{cp}$ is defined by the sub pixel electrode PE2 and the coupling electrode CE, a first storage capacitor $C_{st1}$ is defined by the main pixel electrode PE1 and the storage line SL, and a second storage capacitor $C_{st2}$ is defined by the sub pixel electrode PE2 and the storage line SL.

Next, a first vertical alignment film 115 that is aligned vertically is provided on the protective layer 114, on which the main and sub pixel electrodes PE1 and PE2 are formed.

The opposite substrate 120 includes a second base substrate 121 facing the first base substrate 111, a black matrix 122 arranged on the second base substrate 121, a color filter 123, and a common electrode 124.

The black matrix 122 is provided on the second base substrate 121 and corresponds to a non-display area (i.e. a region in which the thin film transistor Tr is formed) of the array substrate 110. The color filter 123 is provided on the second base substrate 121 and corresponds to an effective display area (i.e. a region in which the main and sub pixel electrodes PE1 and PE2 are formed) of the array substrate 110.

The common electrode 124 is formed on the black matrix 122 and the color filter 123. The common electrode 124 faces the main and sub pixel electrodes PE1 and PE2 and the liquid crystal layer 130 is interposed therebetween. Thus, a first liquid crystal capacitor $C_{lc1}$ is defined by the common electrode 124 and the main pixel electrode PE1, and a second liquid crystal capacitor $C_{lc2}$ is defined by the common electrode 124 and the sub pixel electrode PE2.

The common electrode 124 is provided with a second opening OP2 formed therethrough to divide the region in which the main and sub pixel electrodes PE1 and PE2 are formed into a plurality of domains. Thus, liquid crystal molecules of the liquid crystal layer 130 are aligned in different directions for each domain.

The common electrode 124 is provided with a second vertical alignment film 125 formed thereon. Thus, the liquid crystal molecules of the liquid crystal layer 130 are aligned vertically by the first and second vertical alignment films 115 and 125.

The liquid crystal layer 130 has a resistivity larger than that of the protective layer. In the present exemplary embodiment, the liquid crystal layer 130 may have a resistivity of about $1 \times 10^{13}$ Ωcm to about $1 \times 10^{15}$ Ωm. Alto, the liquid crystal layer 130 may have a thickness of about 2 μm to about 5 μm.

Figure 3:
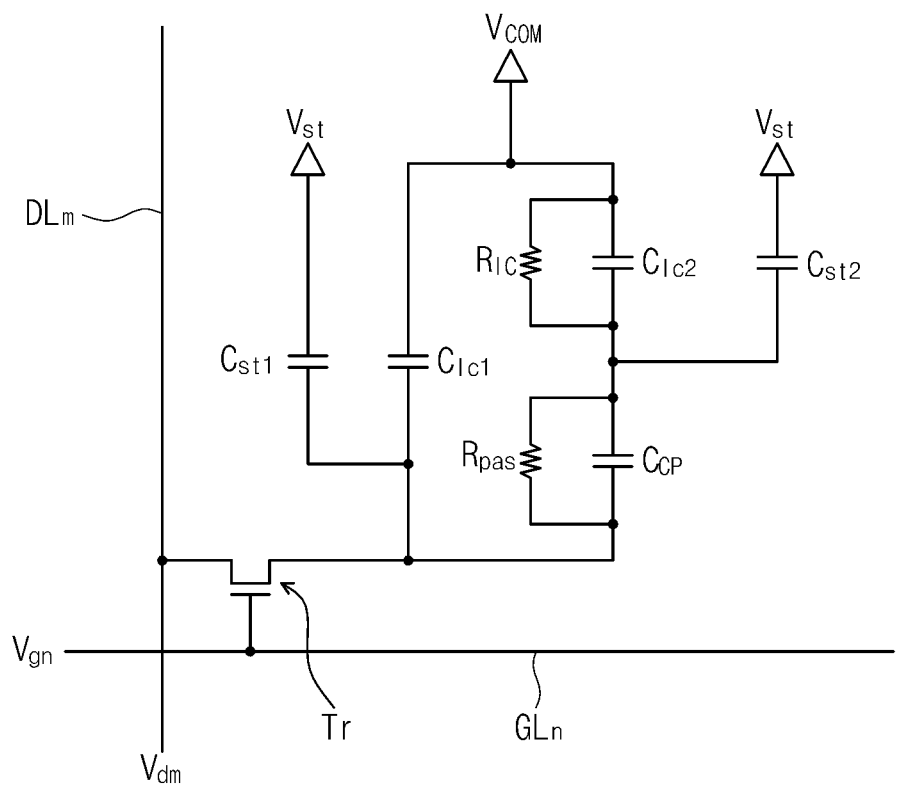
FIG. 3 is an equivalent circuit diagram showing an $(n \times m)^{th}$ pixel of FIG. 1.

FIG. 3 is an equivalent circuit diagram showing the $(n \times m)^{th}$ pixel of FIG. 1.

Referring to FIG. 3, the $(n \times m)^{th}$ pixel is connected to the $n^{th}$ gate line $GL_n$ and the $m^{th}$ data line $DL_m$. Particularly, the thin film transistor Tr of the $(n \times m)^{th}$ pixel is connected to the $n^{th}$ gate line $GL_n$ and the $m^{th}$ data line $DL_m$. The thin film transistor Tr outputs an $m^{th}$ data voltage $V_{dm}$ applied to the $m^{th}$ data line $DL_m$ in response to an $n^{th}$ gate voltage $V_{gn}$ applied to the $n^{th}$ gate line $GL_n$.

The first liquid crystal capacitor $C_{lc1}$ and the first storage capacitor $C_{st1}$ are connected in parallel to the drain electrode of the thin film transistor Tr, and the coupling capacitor $C_{cp}$ is connected to the drain electrode and connected in parallel to the first liquid crystal capacitor $C_{lc1}$. The second liquid crystal capacitor $C_{lc2}$ is connected in series to the coupling capacitor $C_{cp}$ and connected in parallel to the second storage capacitor $C_{st2}$.

The $m^{th}$ data voltage $V_{dm}$ output from the drain electrode of the thin film transistor Tr is provided to the main pixel electrode PE1 (shown in FIG. 1), which is defined as a first electrode of the first liquid crystal capacitor $C_{lc1}$ and the first storage capacitor $C_{st1}$, and to the coupling electrode CE, which is defined as a first electrode of the coupling capacitor $C_{cp}$.

A common voltage $V_{com}$ is applied to the common electrode 124 (shown in FIG. 2) that is defined as a second electrode of the first and second liquid crystal capacitors $C_{lc1}$ and $C_{lc2}$, and a storage voltage $V_{st}$ is applied to the storage line SL (shown in FIG. 1) that is defined as a second electrode of the first and second storage capacitors $C_{st1}$ and $C_{st2}$. The storage voltage $V_{st}$ may have the same voltage level as the common voltage $V_{com}$, however, in the present exemplary embodiment, the storage voltage $V_{st}$ and the common voltage $V_{com}$ have different voltage levels.

Assuming that the common voltage $V_{com}$ is about 0V, the first liquid crystal capacitor $C_{lc1}$ is charged with a main pixel voltage having a same voltage level as the $m^{th}$ data voltage $V_{dm}$. As an example of the present exemplary embodiment, the common voltage $V_{com}$ is assumed to be about 0V, and the first liquid crystal capacitor $C_{lc1}$ is charged with a voltage corresponding to an electric potential difference between the common voltage $V_{com}$ and the $m^{th}$ data voltage $V_{dm}$.

The $m^{th}$ data voltage $V_{dm}$ is divided due to the capacitances of the coupling capacitor $C_{cp}$ and the second liquid crystal capacitor $C_{lc2}$. Thus, the second liquid crystal capacitor $C_{lc2}$ is charged with a sub pixel voltage that is lowered by a voltage charged in the coupling capacitor $C_{cp}$ and has a lower voltage level than that of the main pixel voltage.

The polarity of the $m^{th}$ data voltage $V_{dm}$ with respect to the common voltage $V_{com}$ is inverted at every frame during which an image corresponding to one screen frame is displayed in the liquid crystal display panel. In the present exemplary embodiment, when the driving frequency is 60 Hz, a frame is defined as 16.7 ms.

When the $m^{th}$ data voltage $V_{dm}$ has positive polarity (+) with respect to the common voltage $V_{com}$, the main and sub pixel voltages having positive polarity are charged in the first and second liquid crystal capacitors $C_{lc1}$ and $C_{lc2}$, respectively. To the contrary, when the $m^{th}$ data voltage $V_{dm}$ has negative polarity (−) with respect to the common voltage $V_{com}$, main and sub pixel voltages having negative polarity are charged in the first and second liquid crystal capacitors $C_{lc1}$ and $C_{lc2}$, respectively.

In the present exemplary embodiment, a first resistance $R_{pas}$ represents the resistance between the sub pixel electrode PE2 and the coupling electrode CE, and a second resistance $R_{lc}$ represents the resistance between the sub pixel electrode PE2 and the common electrode 124.

The second resistance $R_{lc}$ changes according to the polarity of the $m^{th}$ data voltage $V_{dm}$ with respect to the common voltage $V_{com}$. When the $m^{th}$ data voltage $V_{dm}$ has positive polarity (+) with respect to the common voltage $V_{com}$, the second resistance $R_{lc}$ may be about $1 \times 10^{13}$ Ω, and when the $m^{th}$ data voltage $V_{dm}$ has negative polarity (−) with respect to the common voltage $V_{com}$, the second resistance $R_{lc}$ may be about $1 \times 10^{14}$ Ω.

The first resistance $R_{pas}$ may be less than the second resistance $R_{lc}$. That is, even though the second resistance $R_{lc}$ changes according to the polarity of the $m^{th}$ data voltage $V_{dm}$, the first resistance $R_{pas}$ may be less than a minimum value of the second resistance $R_{lc}$.

The first resistance $R_{pas}$ is decided by the resistivity of the protective layer 114 (shown in FIG. 2) interposed between the sub pixel electrode PE2 and the coupling electrode CE. That is, the first resistance $R_{pas}$ may decrease as the resistivity of the protective layer 114 decreases. As an example of the present exemplary embodiment, the resistivity of the protective layer 114 may be about $1 \times 10^{12}$ $\Omega$cm, which is less than 1/100 of that in a conventional S-PVA mode LCD.

Figure 4A:
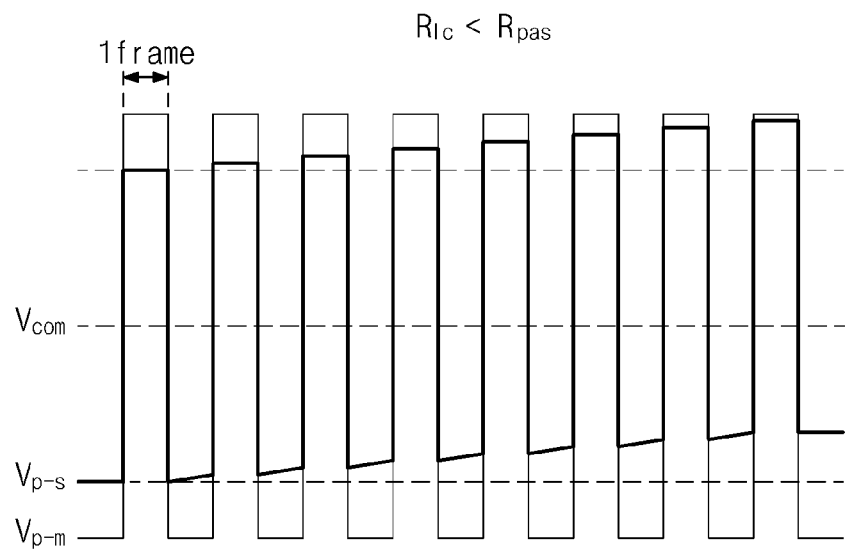
FIG. 4A is a waveform diagram showing a main pixel voltage and a sub pixel voltage in a conventional S-PVA mode liquid crystal display panel.
Figure 4B:
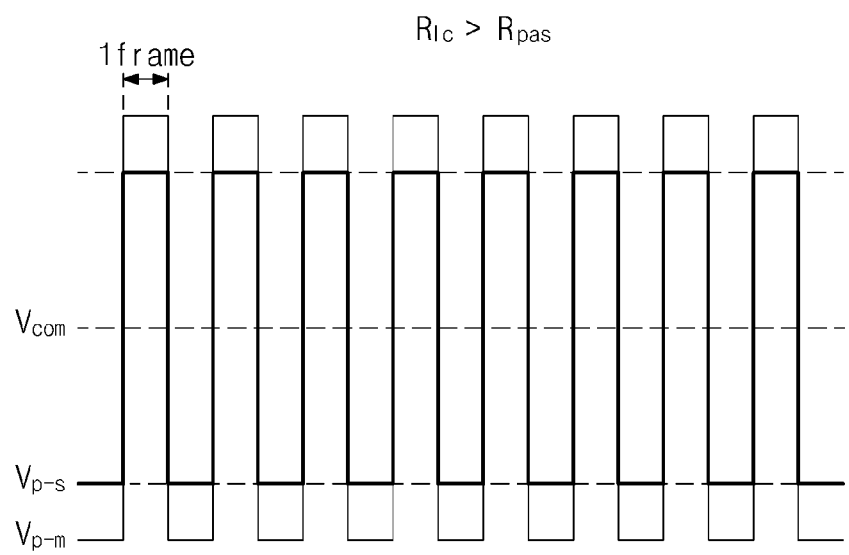
FIG. 4B is a waveform diagram showing a main pixel voltage and a sub pixel voltage in a S-PVA mode liquid crystal display panel according to an exemplary embodiment of the present invention.

FIG. 4A is a waveform diagram showing a main pixel voltage and a sub pixel voltage in a conventional S-PVA mode LCD, and FIG. 4B is a waveform diagram showing a main pixel voltage and a sub pixel voltage in a S-PVA mode LCD according to an exemplary embodiment of the present invention. FIG. 4A shows the variation of a sub pixel voltage $V_{p-s}$ as a function of a time when the second resistance $R_{lc}$ is less than the first resistance $R_{pas}$.

Referring to FIG. 4A, the polarities of a main pixel voltage $V_{p-m}$ and a sub pixel voltage $V_{p-s}$ are inverted at every frame with respect to a common voltage $V_{com}$. When the second resistance $R_{lc}$ is less than the first resistance $R_{pas}$, the main pixel voltage $V_{p-m}$ is uniformly maintained. However, the sub pixel voltage $V_{p-s}$ gradually increases as time passes. The variation of the sub pixel voltage $V_{p-s}$ causes a change in the leakage current amount, which may cause an afterimage to be displayed on a liquid crystal display panel.

Referring to FIG. 4B, when the second resistance value $R_{lc}$ is greater than the first resistance value $R_{pas}$, the main and sub pixel voltages $V_{p-m}$ and $V_{p-s}$ are uniformly maintained even though time passes. That is, although the polarity of the sub pixel voltage $V_{p-s}$ changes, the leakage current of the liquid crystals is as same as before, which may prevent an afterimage from being displayed on the liquid crystal display panel.

As described in FIG. 1, FIG. 2, FIG. 3, FIG. 4A, and FIG. 4B, since the resistivity of the protective layer 114 interposed between the sub pixel electrode PE2 and the coupling electrode CE is decreased, the resistance between the sub pixel electrode PE2 and the coupling electrode CE may be less than the resistance between the sub pixel electrode PE2 and the common electrode 124, so that the sub pixel voltage $V_{p-s}$ does not change as a function of a time. Thus, the occurrence of afterimages on the liquid crystal display panel 100 may be prevented, thereby preventing deterioration of display quality.

Figure 5:
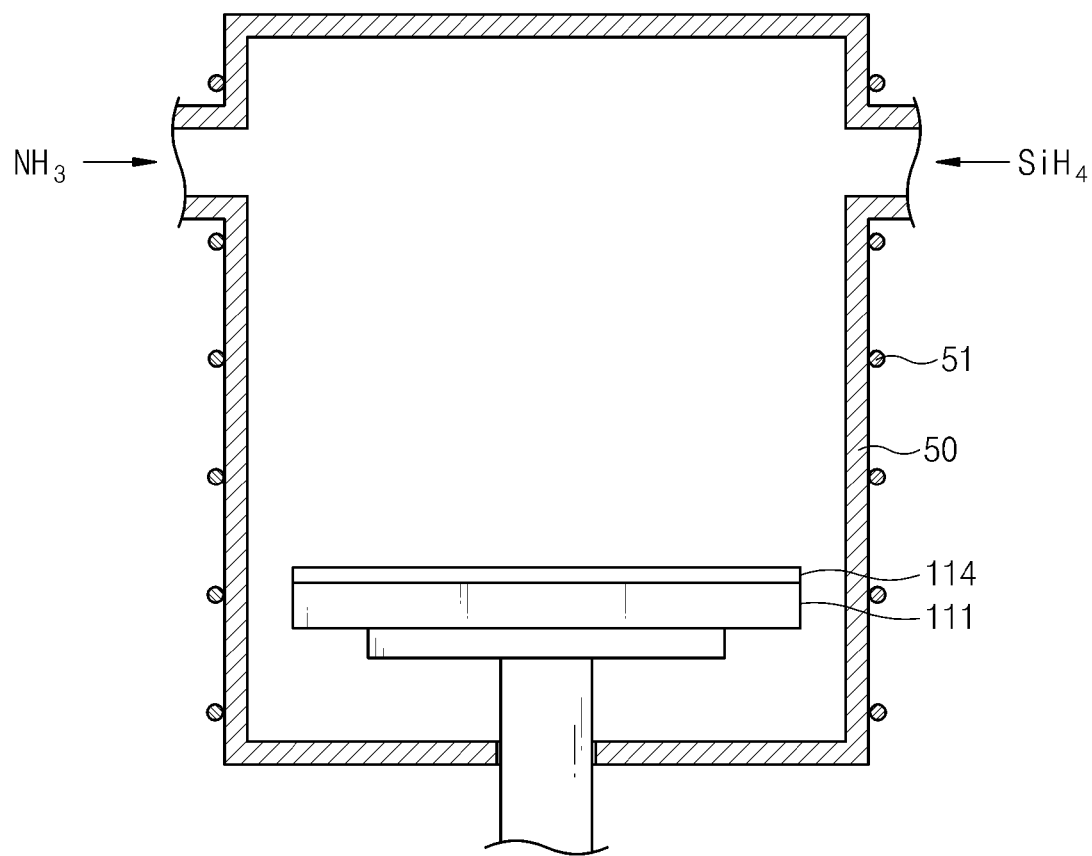
FIG. 5 is a sectional view showing a process of forming a protective layer according to an exemplary embodiment of the present invention.

FIG. 5 is a sectional view showing a process of forming a protective layer according to an exemplary embodiment of the present invention.

Referring to FIG. 5, a substrate that is heat-treated is placed inside a reactor 50. As an example of the present exemplary embodiment, the substrate serves as the first base substrate 111 on which the thin film transistor Tr, the coupling electrode CE, and the storage line SL are formed (refer to FIG. 2).

A plasma generator 51 to which a radio frequency (RF) power is applied is arranged on an external wall of the reactor 50. In the present exemplary embodiment, the plasma generator 51 may include coils.

Silicon-containing gas and nitrogen-containing gas are injected into the reactor 50. As an example of the present exemplary embodiment, the silicon-containing gas may be silane gas ($SiH_4$), and the nitrogen-containing gas may be ammonia gas ($NH_3$).

The gases react with each other on the heat-treated first base substrate 111, thereby depositing a protective layer 114 on the first base substrate 111.

The resistivity of the protective layer 114 may vary according to the RF power applied to the plasma generator 51 or the flow amount ratio of nitrogen-containing gas to silicon-containing gas.

Figure 6:
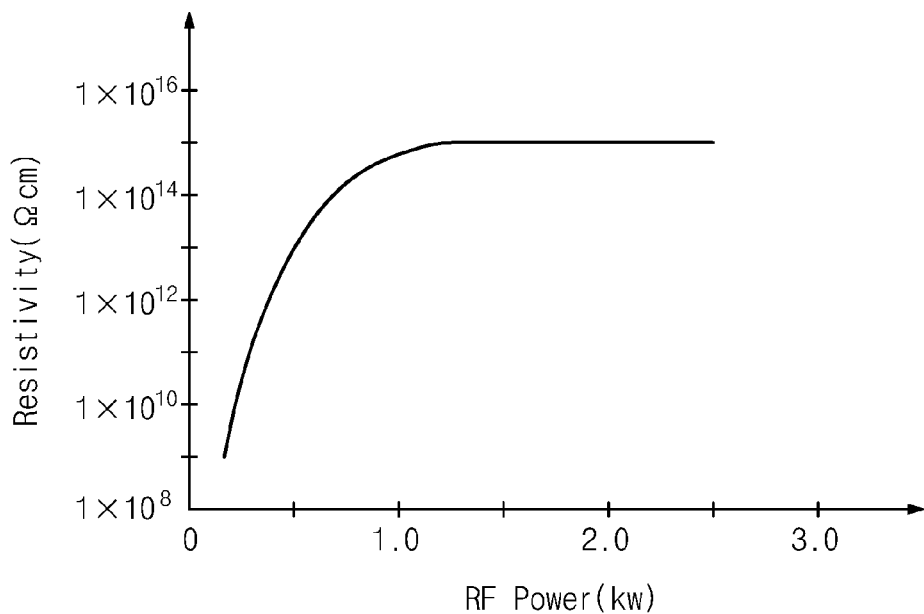
FIG. 6 is a graph showing a resistivity of a protective layer as a function of a RF power.
Figure 7:
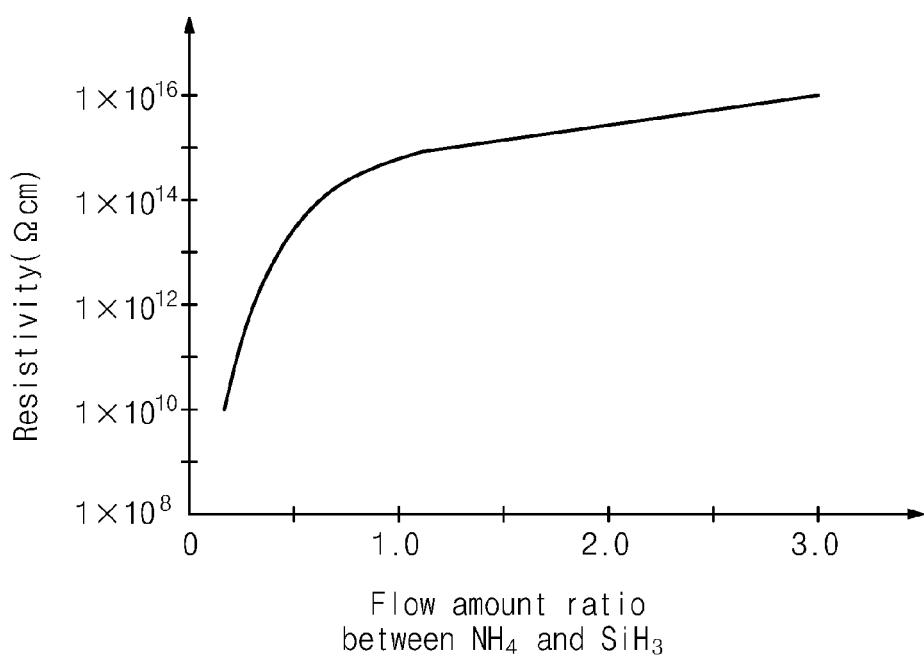
FIG. 7 is a graph showing a resistivity of a protective layer as a function of a flow amount ratio of silicon-containing gas to nitrogen-containing gas.

FIG. 6 is a graph showing the resistivity of the protective layer as a function of RF power, and FIG. 7 is a graph showing the resistivity of the protective layer as a function of the flow amount ratio of silicon-containing gas to nitrogen-containing gas.

As shown in FIG. 6, the resistivity of the protective layer 114 decreases as the RF power decreases. That is, when a low RF power is applied to the plasma generator 51 during the deposition process, the resistivity of the protective layer 114 may be decreased. As an example of the present exemplary embodiment, a resistivity of the protective layer 114 of about $1 \times 10^{12}$ $\Omega$cm may be obtained by applying an RF power of about 0.25 kW.

As shown in FIG. 7, when the flow amount ratio of silane gas ($SiH_4$) to ammonia gas ($NH_3$) decreases, the resistivity of the protective layer 114 decreases. That is, when the flow amount ratio of silane gas ($SiH_4$) to ammonia gas $NH_3$ is lowered during the deposition process, the resistivity of the protective layer 114 may decrease. As an example of the present exemplary embodiment, a resistivity of the protective layer 114 of about $1 \times 10^{12}$ $\Omega$cm may be obtained by setting the flow amount ratio of silane gas ($SiH_4$) to ammonia gas ($NH_3$) at about 0.25.

By controlling the resistivity of the protective layer 114 using the above described methods, the first resistance $R_{pas}$ between the sub pixel electrode PE2 and the coupling electrode CE may be less than the second resistance $R_{lc}$ between the sub pixel electrode PE2 and the common electrode 124.

According to the above, the resistance between the coupling electrode and the sub pixel electrode may be less than the resistance between the sub pixel electrode and the common electrode, and the resistance between the coupling electrode and the sub pixel electrode may be determined by the resistivity of the protective layer interposed between the coupling electrode and the sub pixel electrode.

Thus, the sub pixel voltage may remain constant as the polarity of the data voltage changes and as time passes, thereby reducing the leakage current difference of the liquid crystals between the positive and negative polarities of the data voltage. Consequently, the occurrence of an afterimage on the liquid crystal display panel may be prevented, so that the display quality of the liquid crystal display panel may be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
   an array substrate comprising a first base substrate and a plurality of pixels arranged on the first base substrate;
   an opposite substrate comprising a second base substrate facing the first base substrate and a common electrode arranged on the second base substrate; and
   a liquid crystal layer interposed between the array substrate and the opposite substrate and having a resistivity of $1 \times 10^{13}$ $\Omega$·cm to $1 \times 10^{15}$ $\Omega$·cm, each pixel comprising:
- a switching device to output a data voltage in response to a gate signal;
- a first pixel electrode connected to an output electrode of the switching device to receive the data voltage;
- a coupling electrode connected to the output electrode of the switching device to receive the data voltage;
- a second pixel electrode facing the coupling electrode; and
- an inter-insulating layer interposed between the coupling electrode and the second pixel electrode,
- wherein the resistance between the coupling electrode and the second pixel electrode is less than the resistance between the second pixel electrode and the common electrode, and the liquid crystal layer has a resistivity larger than that of the inter-insulating layer for reduction in leakage current variations and preventing an afterimage.

2. The liquid crystal display panel of claim 1, wherein the inter-insulating layer comprises a silicon nitride layer.

3. The liquid crystal display panel of claim 1, wherein the resistance between the second pixel electrode and the coupling electrode decreases as the resistivity of the inter-insulating layer decreases.

4. The liquid crystal display panel of claim 3, wherein the resistivity of the inter-insulating layer is equal to or smaller than $1 \times 10^{12}$ $\Omega$cm.

5. The liquid crystal display panel of claim 1, wherein the array substrate further comprises:
- a plurality of gate lines; and
- a plurality of data lines insulated from and crossing the gate lines to define a plurality of pixel areas, the pixels being respectively arranged in the pixel areas.

6. The liquid crystal display panel of claim 5, wherein the inter-insulating layer is arranged on the first base substrate to cover the switching device, the gate lines, the data lines, and the coupling electrode, and the first pixel electrode and the second pixel electrode are arranged on the inter-insulating layer.

7. The liquid crystal display panel of claim 1, wherein the first pixel electrode and the common electrode define a first liquid crystal capacitor in which a first pixel voltage is charged, and the second pixel electrode and the common electrode define a second liquid crystal capacitor in which a second pixel voltage is charged, the second pixel voltage having a lower voltage than that of the first pixel voltage.

8. The liquid crystal display panel of claim 7, wherein the common electrode receives a common voltage, and polarities of the first pixel voltage and the second pixel voltage are inverted at every frame with respect to the common voltage.

9. The liquid crystal display panel of claim 8, wherein the resistance between the second pixel electrode and the common electrode varies according to the polarity of the second pixel voltage with respect to the common voltage.

* * * * *